(12) United States Patent
Lin

(10) Patent No.: US 8,250,713 B2
(45) Date of Patent: Aug. 28, 2012

(54) HINGE ASSEMBLY ADAPTED TO ALLOW CABLE TO BE DISPOSED THEREIN QUICKLY

(75) Inventor: Chao-Chi Lin, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 449 days.

(21) Appl. No.: 12/580,320

(22) Filed: Oct. 16, 2009

(65) Prior Publication Data

US 2010/0306963 A1 Dec. 9, 2010

(30) Foreign Application Priority Data

Jun. 5, 2009 (TW) .............................. 98209914 U

(51) Int. Cl.
*E05D 3/10* (2006.01)
(52) U.S. Cl. ................. 16/367; 16/309; 16/376; 16/377
(58) Field of Classification Search .................... 16/277, 16/309, 312, 333, 337, 343, 350, 367, 376–377, 16/386; 361/679.07
See application file for complete search history.

(56) References Cited

U.S. PATENT DOCUMENTS

| | | | | |
|---|---|---|---|---|
| 5,390,075 A * | 2/1995 | English et al. | ........... | 361/679.28 |
| 5,572,769 A * | 11/1996 | Spechts et al. | .................. | 16/337 |
| 5,951,312 A * | 9/1999 | Horng | ........................... | 439/165 |
| 6,484,016 B1 * | 11/2002 | Cheon | ........................... | 455/90.1 |
| 6,867,961 B2 * | 3/2005 | Choi | ........................ | 361/679.06 |
| 7,013,532 B2 * | 3/2006 | Lu et al. | .......................... | 16/337 |
| 7,267,566 B2 * | 9/2007 | Ku et al. | ....................... | 439/165 |
| 7,469,451 B2 * | 12/2008 | Hashizume | ..................... | 16/386 |
| 2004/0002241 A1 * | 1/2004 | Lee | ................................ | 439/165 |
| 2006/0143863 A1 * | 7/2006 | Schoolcraft et al. | ............ | 16/347 |

* cited by examiner

*Primary Examiner* — Victor Batson
*Assistant Examiner* — Roberta Delisle
(74) *Attorney, Agent, or Firm* — Alan Kamrath; Kamrath IP Lawfirm, PA

(57) ABSTRACT

A hinge assembly, which allows a cable to be disposed therein quickly, includes a first coupling member with a first hole and a first slot, a second coupling member with a second hole and a second slot, and a limit member with a third hole and a third slot. The first, second and third holes collectively define a compartment, with the first, second and third holes being aligned one another. The first, second and third slots collectively define an entrance, with the first, second and third slots being aligned one another. The entrance defines a space with a size greater than a cross-sectional size of the cable to allow insertion of the cable. The limit member is operably rotatable to a position that the cable is retained in the compartment and is prevented from exiting from the entrance.

16 Claims, 16 Drawing Sheets

HINGE ASSEMBLY ADAPTED TO ALLOW CABLE TO BE DISPOSED THEREIN QUICKLY

BACKGROUND OF THE INVENTION

1. Field of the Invention

The present invention relates to a hinge assembly which is adapted to be used in connection with an electronic device and, in particular, to a hinge assembly which is adapted to allow a cable to be disposed therein quickly.

2. Description of the Related Art

Generally, a hinge assembly which is used in connection with an electronic device includes a cable mounted therein. When installing the cable onto the hinge assembly, a conventional way is that one assembles hinge assembly parts and inserts the cable through the hinge assembly afterwards. The cable would include a section disposed in the hinge assembly, and this section is generally concealed for the purpose of protecting the cable from damage and for safety and aesthetic appearance reasons. However, it is difficult to insert the cable through the hinge assembly, and it is risky that one might entangle the cable in the hinge assembly. Thus, the cable can suffer a problem of poor connection with the electronic device.

Nowadays, either hinge-supplying factories will hand over the hinge assemblies to cable-supplying factories who will install the cables onto the hinge assemblies, or the cable-supplying factories will hand over cables to the hinge-supplying factories who will do this job. After that, these semi-products will be handed over to factories which assemble electronic devices. Therefore, it would be difficult to judge whether the cable itself has defects or whether the cable is damaged during installation onto the hinge assembly.

The present invention is, therefore, intended to obviate or at least alleviate the problems encountered in the prior art.

SUMMARY OF THE INVENTION

According to the present invention, a hinge assembly, which is adapted to allow a cable to be disposed therein quickly, includes a first coupling member including a first hole and a first slot extending therethrough, and being connected to and in communication with each other. A second coupling member includes a first engaging section inserted through and being rotatable in the first hole, and a second hole and a second slot extending through the first engaging section. Additionally, the second hole and second slot are connected to and in communication with each other. A limit member is engaged with and rotatable with respect to the first engaging section and includes a third hole and a third slot extending therethrough. Additionally, the third hole is inserted by the first engaging section and is connected to and in communication with the third slot.

The first, second and third holes collectively define a compartment, with the first, second and third holes being aligned one another, and the first, second and third slots collectively define an entrance, with the first, second and third slots being aligned one another.

The entrance defines a space with a size greater than a cross-sectional size of the cable to allow insertion of the cable from the entrance into the compartment.

The limit member is operably rotatable to a first position where the third slot corresponds to and aligns with the first and second slots, and a second position where the third slot is out of alignment from the first and second slots and where the entrance is closed by the limit member to an extent that the cable is retained in the compartment and is prevented from exiting from the entrance.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

For the present disclosure to be easily understood and readily practiced, the present disclosure will now be described in conjunction with the following figures, wherein.

DETAILED DESCRIPTION OF THE PREFERRED EMBODIMENTS

Figure 1:
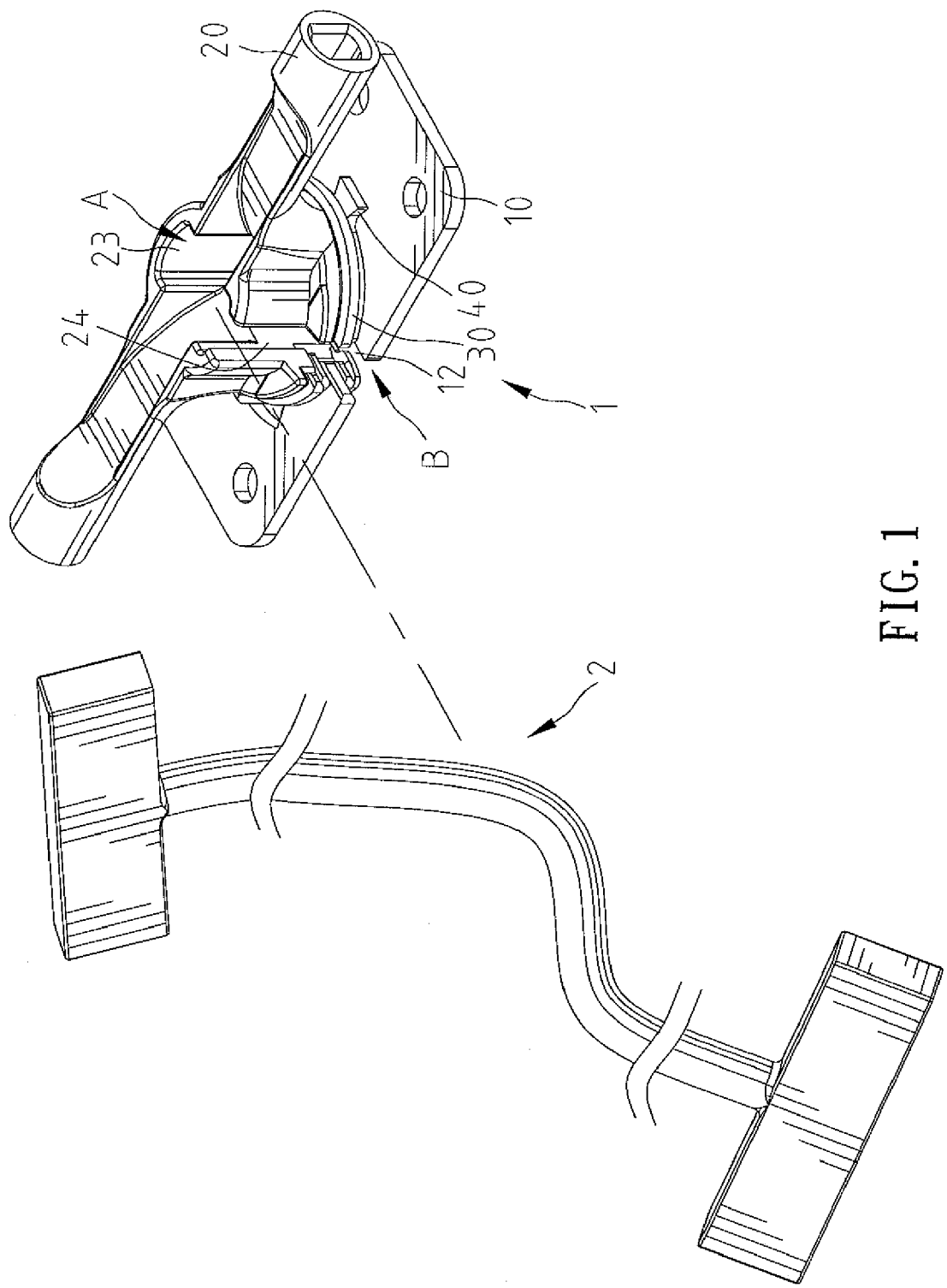
FIG. 1 is a perspective view showing a hinge assembly in accordance with the present invention and a cable for an electronic device adapted to be installed onto the hinge assembly
Figure 2:
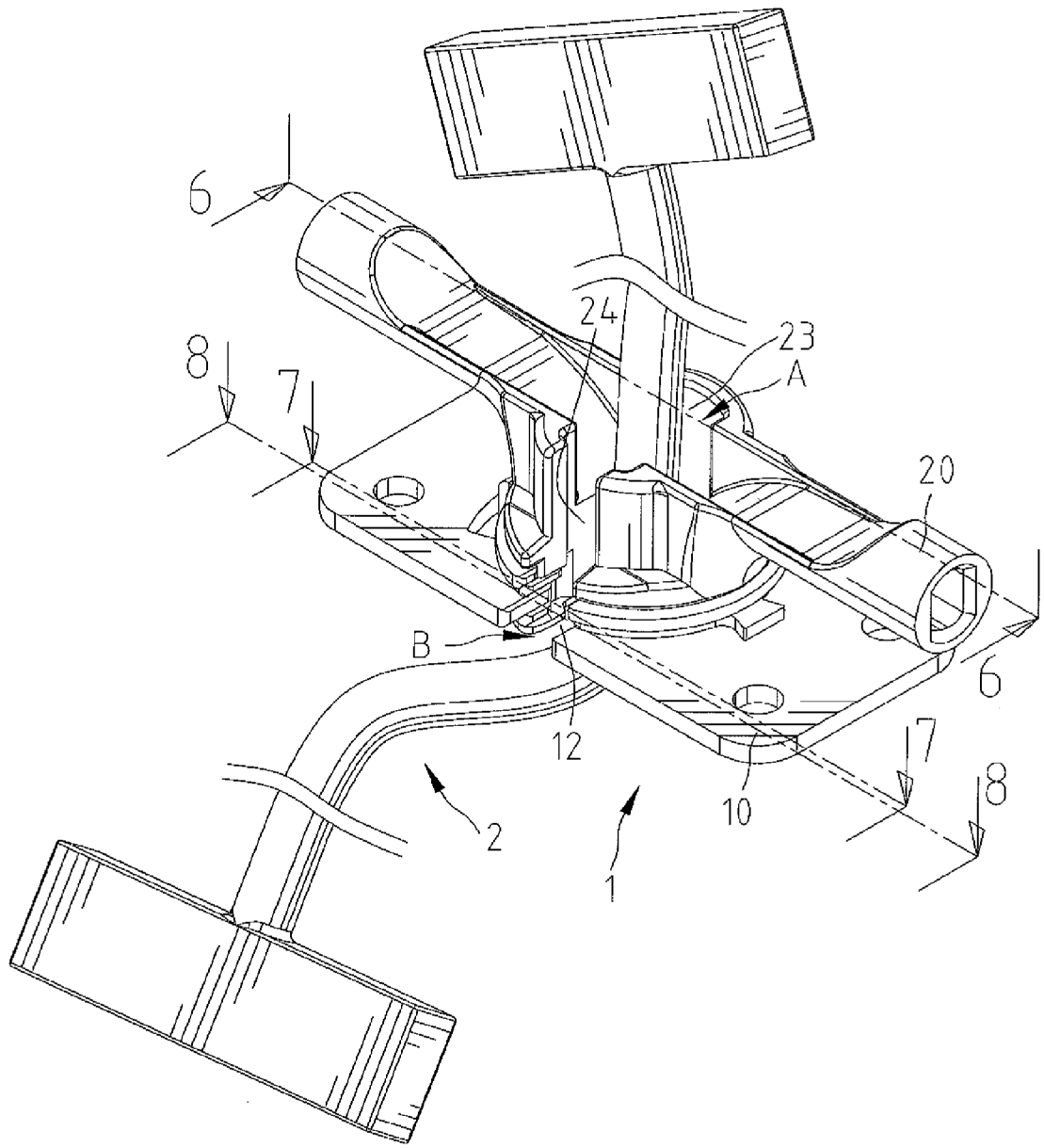
FIG. 2 is a perspective view showing the cable installed onto the hinge assembly, with the cable inserted through the hinge assembly.
Figure 3:
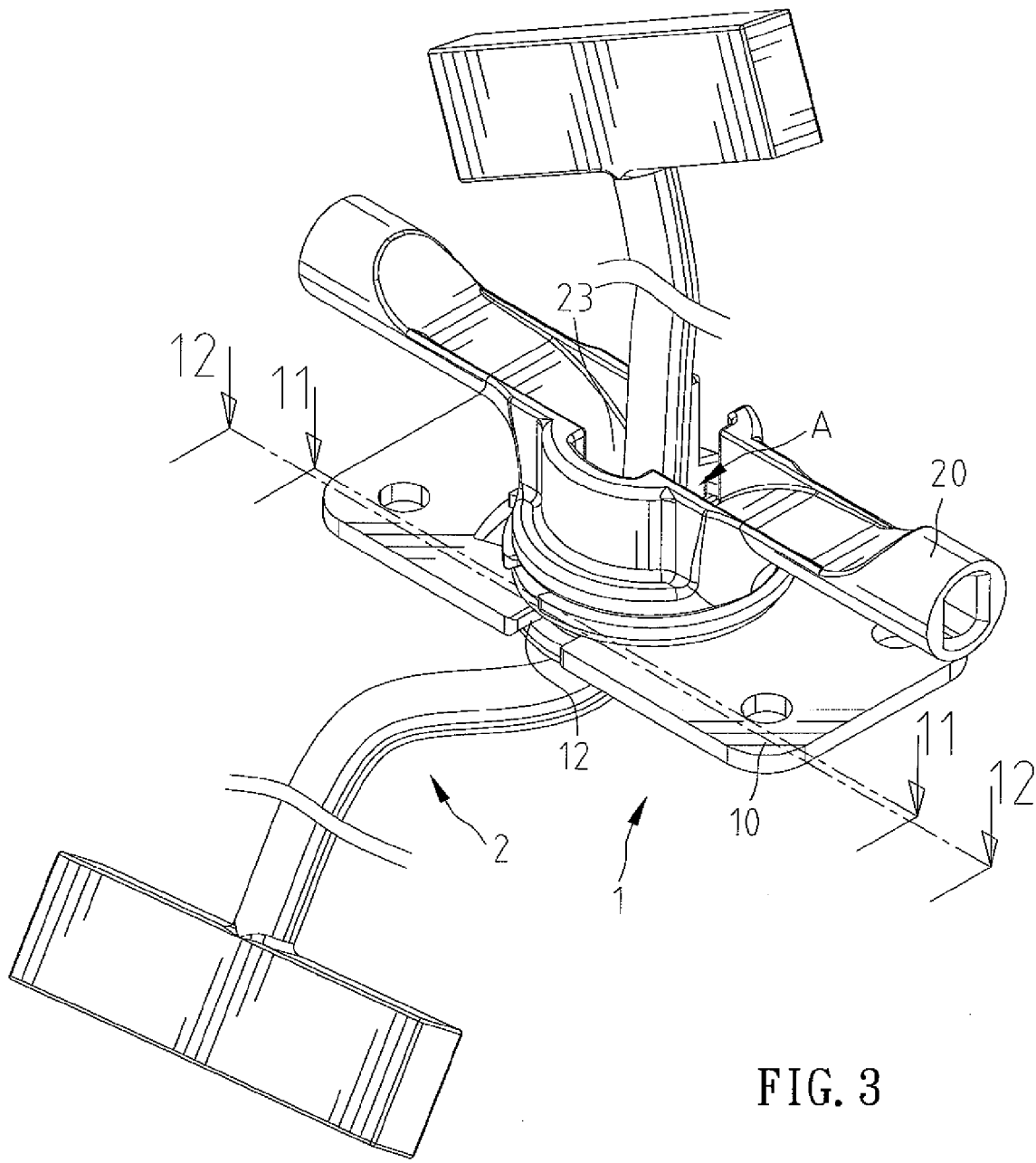
FIG. 3 is an extended perspective view of FIG. 2 and shows the hinge assembly in a position closing its entrance through which the cable is moved.
Figure 4:
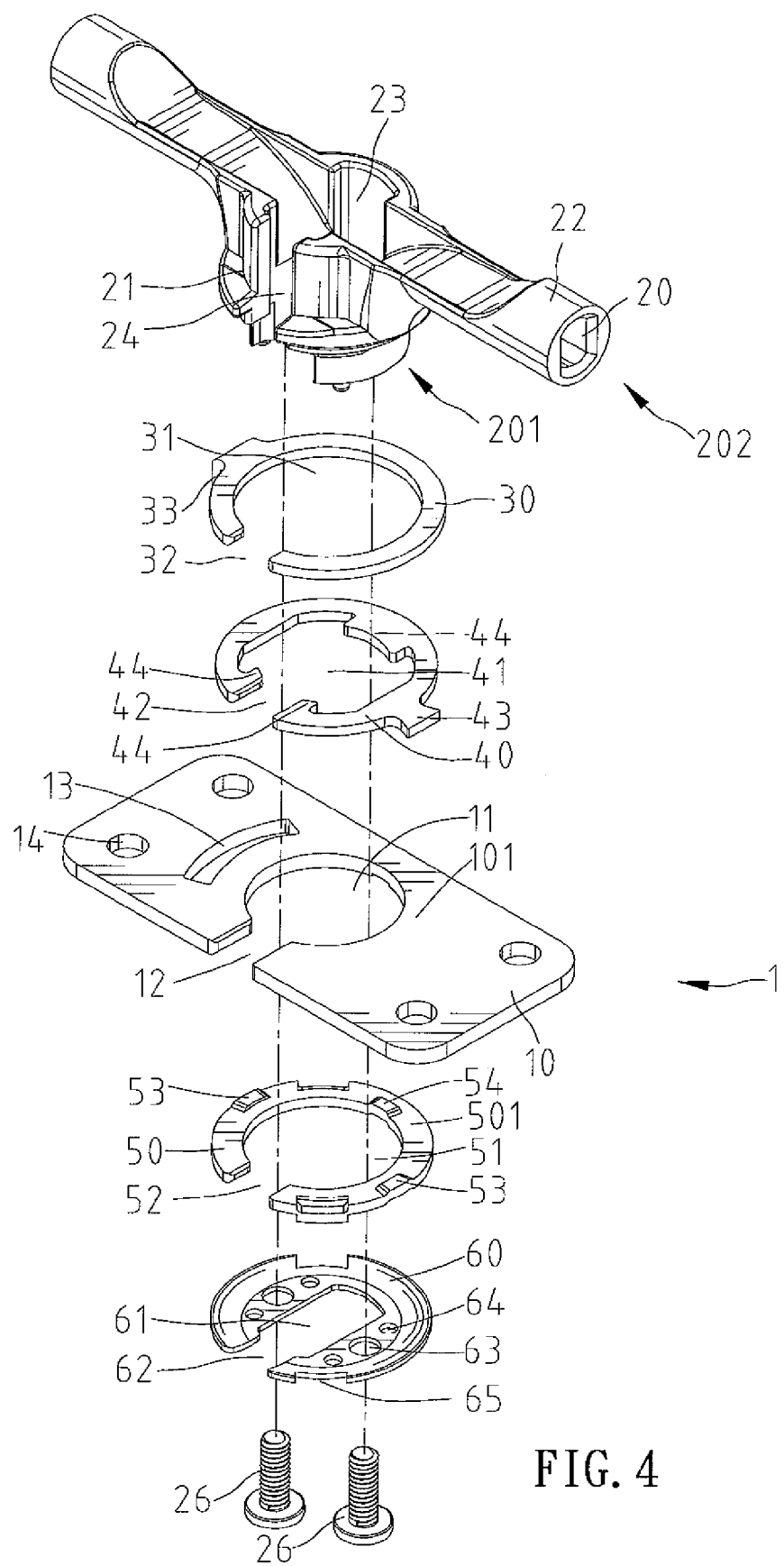
FIG. 4 is an exploded perspective view of the hinge assembly of FIG. 1.
Figure 5:
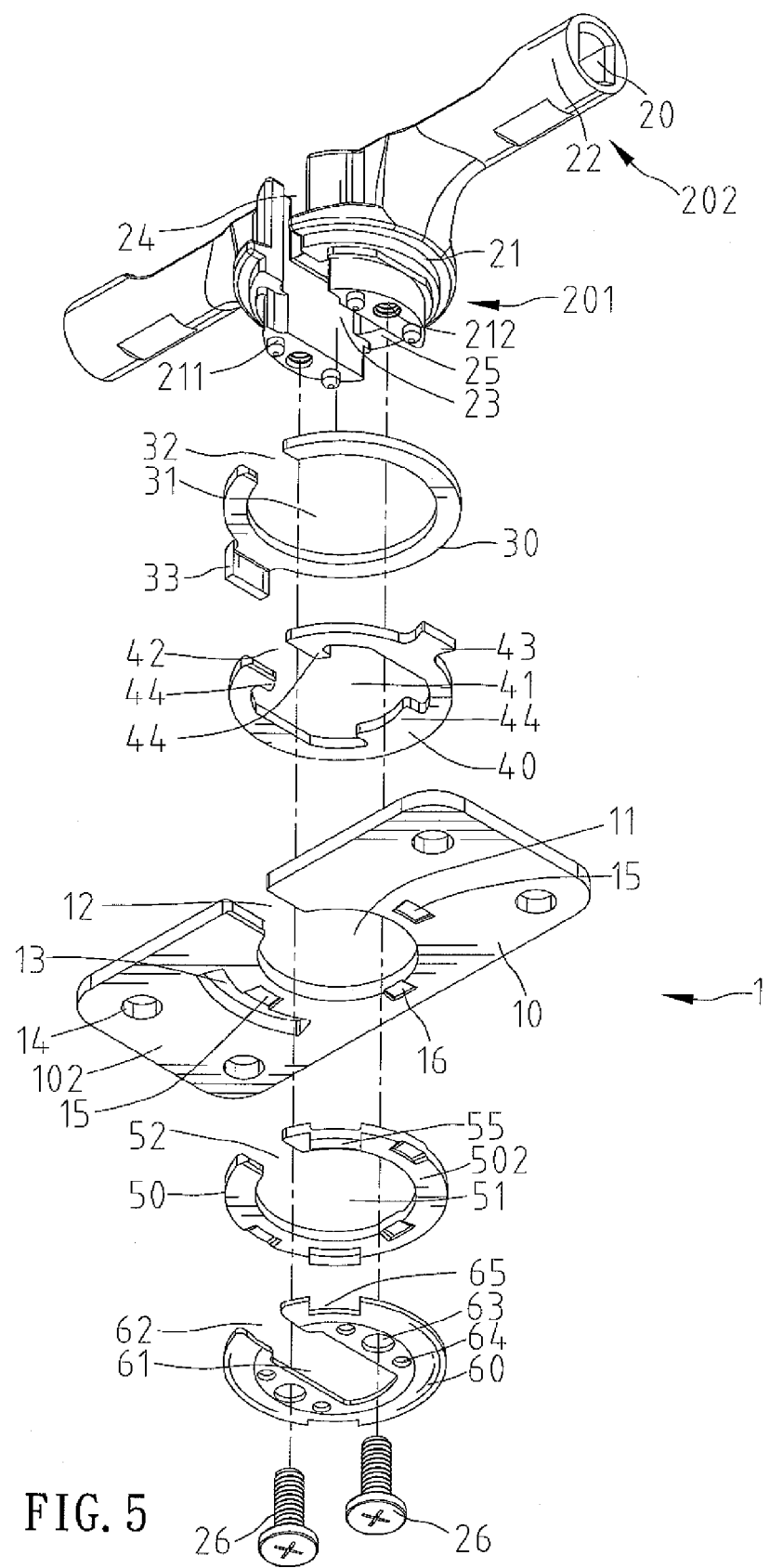
FIG. 5 is another exploded perspective view of the hinge assembly taken from a different view than that of FIG. 4.
Figure 6:
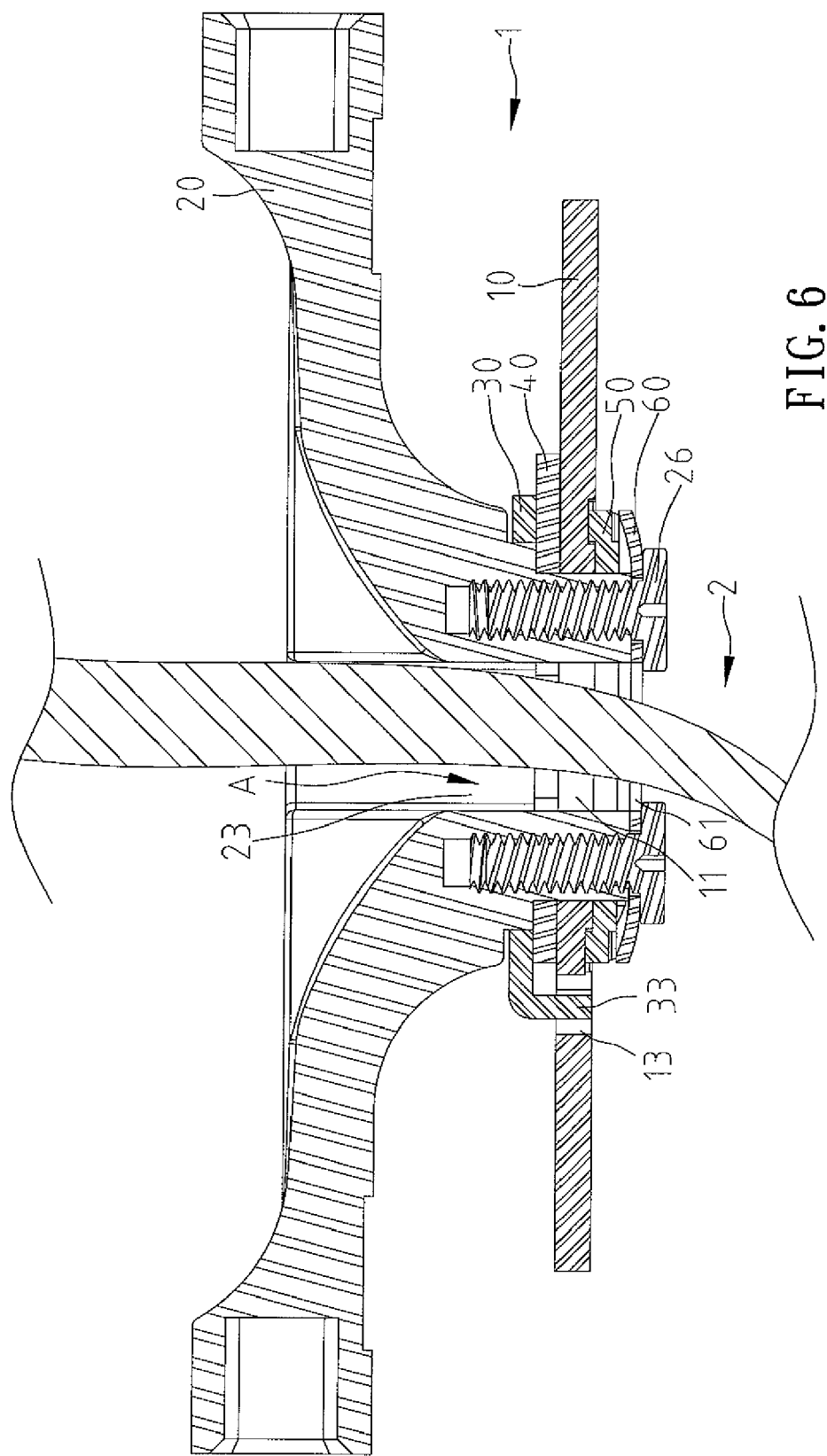
FIG. 6 is a cross-sectional view taken along line 6-6 of FIG. 2.
Figure 7:
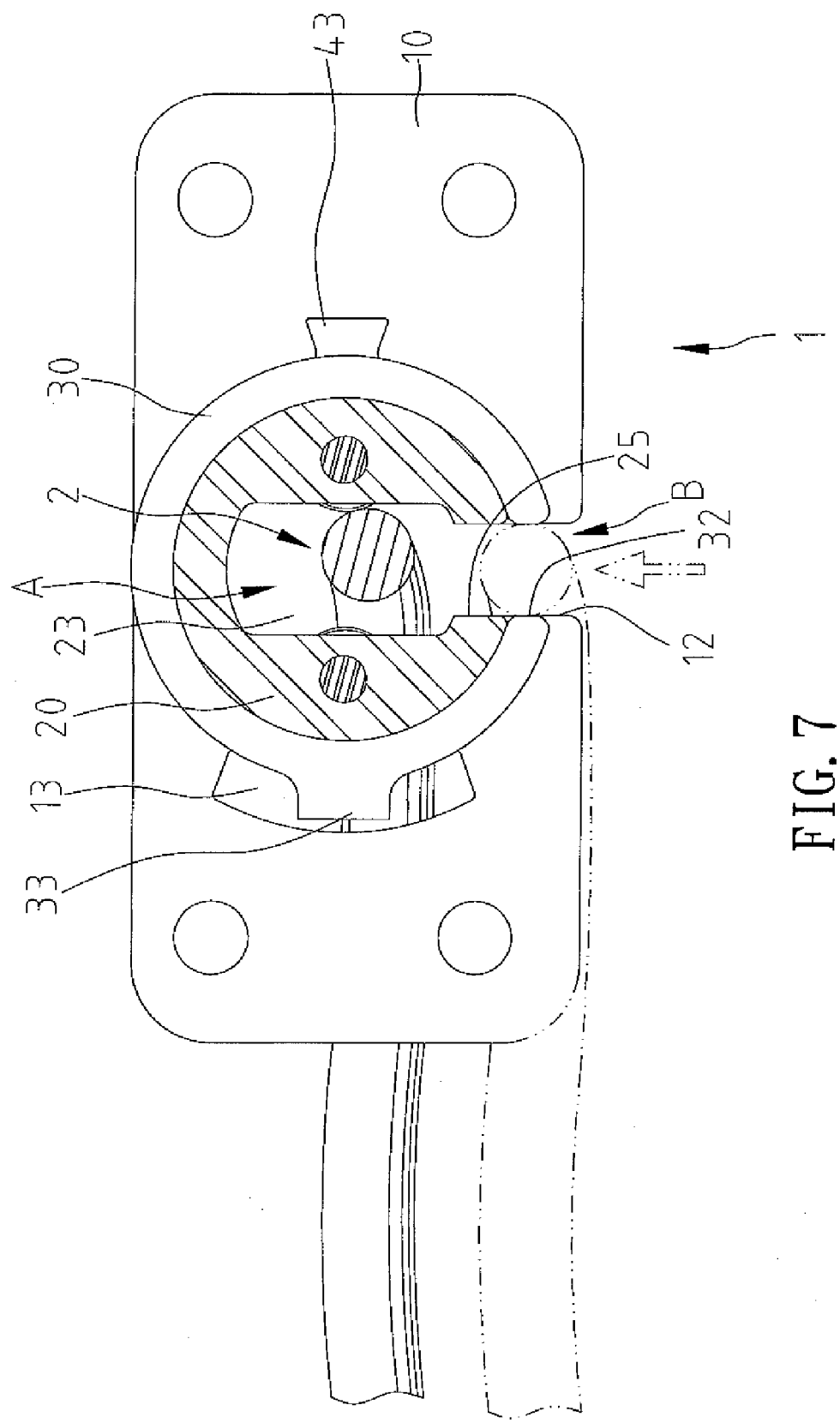
FIG. 7 is a cross-sectional view taken along line 7-7 of FIG. 2 and illustrates the cable moved through the entrance of the hinge assembly.
Figure 8:
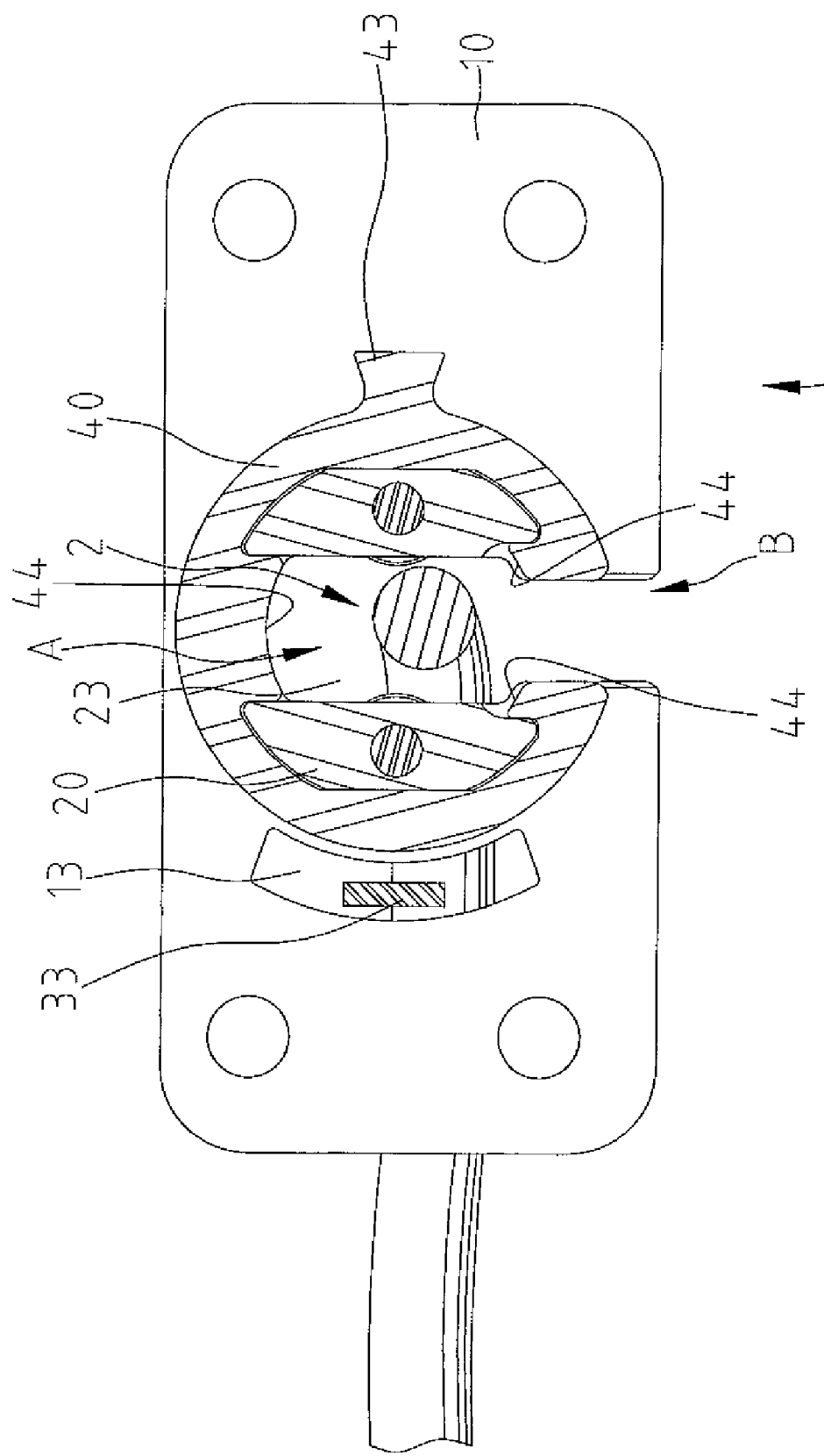
FIG. 8 is a cross-sectional view taken along line 8-8 of FIG. 2.

Referring to the drawings, a hinge assembly 1 in accordance with the present invention is adapted to be used in connection with an electronic device. The hinge assembly 1 can receive a cable 2 therein, and the cable 2 includes proximal and distal ends disposed outside the hinge assembly 1.

Additionally, the cable 2 includes two connectors (shown in rectangular blocks) connected to its proximal and distal ends, respectively.

The hinge assembly includes a first coupling member 10 including a first side 101 and a second side 102 opposite to the first side 101 and adapted to connect to one of the base and cover of the electronic device. In the embodiment, the first coupling member 10 includes a plurality of apertures 14 extending from the first side 101 to the second side 102, and a plurality of fasteners can be inserted through these apertures 14, respectively, and engage with the one of the base and cover to secure the first coupling member 10 on the selected base and cover. The first coupling member 10 also includes a hole 11, a slot 12, and a groove 13 extending from the first side 101 to the second side 102. The hole 11 and slot 12 are connected to and in communication with each other. The slot 12 extends inwardly from a lateral edge, which extends from a circumferential edge of the first side 101 to a circumferential edge of the second side 102, to a circumferential edge of the hole 11. Thus, the circumferential edge of the hole 11 is not enclosed and defines a gap. Additionally, this gap determines the minimum space defined in the slot 12. The space may remain constant or increased in size towards the lateral edge, and the size is greater than the cross-sectional size of the cable 2 to allow insertion of the cable 2 from the slot 12 into the hole 11. The groove 13 is disposed adjacent to the hole 11 and includes a circumferential edge which is enclosed. The first coupling member 10 further includes a plurality of cavities recessed from the second side 102 towards the first side 101. In the embodiment, the plurality of cavities includes two first cavities 15 and one second cavity 16. The two first cavities 15 are disposed adjacent to the hole 11 with equal radial distance. One of the first cavities is connected to and in communication with the groove 13, while the other includes an enclosed circumferential edge. The second cavity 16 is connected to and in communication with the hole 11.

The hinge assembly also includes a second coupling member 20 including a first end 201 and a second end 202, and a first engaging section 21. The first engaging section 21 includes a longitudinal length extending from the first end 201 to the second end 202 and is adapted to insert through the hole 11 and to mount to the first coupling member 10. The first engaging section 21 is rotatable in the hole 11. Thus, the second coupling member 20 is rotatable with respect to the first coupling member 10 about the longitudinal length of the first engaging section 21. The second coupling member 20 further includes a second engaging section 22. The second engaging section 22 is disposed on the second end 202 and extends in a longitudinal direction transverse to the longitudinal direction of the first engaging section 21 and is adapted to connect to the other of the base and cover of the electronic device. The second coupling member 20 also includes a hole 23 and a slot 24 extending from the first end 201 to the second end 202 and through the first engaging section 21. The hole 23 and slot 24 are connected to and in communication with each other. The slot 24 extends inwardly from an outer peripheral edge of the first engaging section 21 to a circumferential edge of the hole 23. Thus, the circumferential edge of the hole 23 is not enclosed and defines a gap. Additionally, this gap determines the minimum space defined in the slot 24. The space may remain constant or increased in size towards the outer peripheral edge, and the size is greater than the cross-sectional size of the cable 2 to allow insertion of the cable 2 from the slot 24 into the hole 23. In addition, the second coupling member 20 receives a limit member 30, a pusher 40, a cam 50, and an elastic member 60 on the outer peripheral edge of the first engaging section 21. The limit member 30 and pusher 40 are disposed on one of the first and second sides 101 and 102 of the first coupling member 10, whereas the cam 50 and elastic member 60 are disposed on the other of the first and second sides 101 and 102.

The limit member 30 includes a hole 31 and a slot 32 extending therethrough. The hole 31 and slot 32 are connected to and in communication with each other. The hole 31 allows insertion of the first engaging section 21 of the second coupling member 20 and includes a circumferential edge moveably engaged with the outer peripheral edge of the first engaging section 21. Thus, the limit member 30 is rotatable with respect to the second coupling member 20. The slot 32 extends inwardly from an outer peripheral edge of the limit member 30 to the circumferential edge of the hole 31. Thus, the circumferential edge of the hole 31 is not enclosed and defines a gap. Additionally, this gap determines the minimum space defined in the slot 32. The space may remain constant or increased in size towards the outer peripheral edge, and the size is greater than the cross-sectional size of the cable 2 to allow insertion of the cable 2 from the slot 32 into the hole 31. In addition, the limit member 30 includes a limiting section 33 extending from its outer peripheral edge and engaged in the groove 13 of the first coupling member 10, and the limiting section 33 is moveable in the groove 13 upon rotation of the limit member 30.

The pusher 40 is disposed between the limit member 30 and first coupling member 10. The pusher 40 includes a hole 41 and a slot 42 extending therethrough. The hole 41 and slot 42 are connected to and in communication with each other. The hole 41 allows insertion of the first engaging section 21 of the second coupling member 20. The hole 41 includes a circumferential edge having a plurality of retaining members 44 extending therefrom and hooked to a plurality of retaining sections 25 defined on the first engaging section 21 of the second coupling member 20 in order to enable the pusher 40 and second coupling member 20 to rotate together. The slot 42 extends inwardly from an outer peripheral edge of the pusher 40 to the circumferential edge of the hole 41. Thus, the circumferential edge of the hole 41 is not enclosed and defines a gap. Additionally, this gap determines the minimum space defined in the slot 42. The space may remain constant or increased in size towards the outer peripheral edge, and the size is greater than the cross-sectional size of the cable 2 to allow insertion of the cable 2 from the slot 42 into the hole 41. In addition, the pusher 40 includes a pushing section 43 extending radially outward from its outer peripheral edge and is selectively engagable with the limiting section 33 to urge the limiting section 33 in the groove 13 upon rotation of the pusher 40.

The cam 50 includes a first side 501, a second side 502 opposite to the first side 501, a hole 51 and a slot 52 extending therethrough, i.e. from its first side 501 to the second side 502. The hole 51 and slot 52 are connected to and in communication with each other. The hole 51 allows insertion of the first engaging section 21 of the second coupling member 20. The slot 52 extends inwardly from an outer peripheral edge of the cam 50 to a circumferential edge of the hole 51. Thus, the circumferential edge of the hole 51 is not enclosed and defines a gap. Additionally, this gap determines the minimum space defined in the slot 52. The space may remain constant or increased in size towards the outer peripheral edge, and the size is greater than the cross-sectional size of the cable 2 to allow insertion of the cable 2 from the slot 52 into the hole 51. In addition, the cam 50 includes a plurality of protuberances extended from and substantially transverse to the first and second sides 501 and 502 sides thereof. In the embodiment, the plurality of protuberances includes two first protuberances 53, one second protuberance 54 on the first side 501, and two third protuberances 55 on the second side 502, respectively. The first and second protuberances 53 and 54 may also form corresponding recesses on the second sides 502, and the third protuberances 55 may form a corresponding recess on the first side 501, respectively. Additionally, the third protuberances 55 are engaged in recessed sections 65 of the elastic member 60, respectively. Thus, the cam 50 and elastic member 60 are not rotatable relative to each other. Moreover, the cam 50 and elastic member 60 are rotatable with the second coupling member 20 by fixing the elastic member 60 to the first engaging section 21 of the second coupling member 20 in a manner that the elastic member 60 and second coupling member 20 can rotate together. In the embodiment, the elastic member 60 is fixed on the first engaging section 21 of the second coupling member 20 by at least one fastener 26. The fastener 26 is inserted through a first aperture 63 extending through the elastic member 60, the hole 51 of the cam 50, the hole 11 of the first coupling member 10, the hole 41 of the pusher 40, and the hole 31 of the limit member 30, and engaged in an orifice 212 extending in the first engaging section 21. Preferably, two fasteners 26 are utilized. Preferably, the fastener 26 and the related orifice 212 are in thread engagement. In addition, the elastic member 60 includes a plurality of second apertures 64 extending therethrough, with two of them being disposed diametrically opposite to each other. The first engaging section 21 of the second coupling member 20 includes a plurality of projections 211 extending in accordance with the longitudinal length of the first engaging section 21 and inserted through and engaged in the plurality of second apertures 64, respectively. Thus, the elastic member 60 and the second coupling member 20 are further prevented from relative rotation therebetween.

Likewise, the elastic member 60 includes a hole 61 and a slot 62 extending therethrough. The hole 61 and slot 62 are connected to and in communication with each other. The hole 61 allows insertion of the first engaging section 21 of the second coupling member 20. The slot 62 extends inwardly from an outer peripheral edge of the elastic member 60 to a circumferential edge of the hole 61. Thus, the circumferential edge of the hole 61 is not enclosed and defines a gap. Additionally, this gap determines the minimum space defined in the slot 62. The space may remain constant or increased in size towards the outer peripheral edge, and the size is greater than the cross-sectional size of the cable 2 so ash to allow insertion of the cable 2 from the slot 62 into the hole 61.

Further, the first protuberances 53 of the cam 50 are engagable in the first cavities 15 of the first coupling member 10, and the second protuberance 54 is engagable in the second cavity 16, respectively. Upon rotation of the cam 50, the first and second protuberances 53 and 54 can be rotated out of the related first and second cavities 15 and 16 and depress the elastic member 60. Preferably, the elastic member 60 has a concave shape that has a central section adapted be spaced from the second side 502 of the cam 50 and has an outer peripheral edge abutting against the second side 502.

FIGS. 7 through 12 show that the cable 2 is connected to the hinge assembly 1 by inserting the cable 2 through an entrance "B" into a compartment "A". The entrance "B" is defined by the slot 12 of the first coupling member 10, the slot 24 of the second coupling member 20, the slot 32 of the limit member 30, the slot 42 of the pusher 40, the slot 52 of the cam 50, and the slot 62 of the elastic member 60, with the slots 12, 24, 32, 42, 52, 62 being aligned one another. The compartment "A" is defined by the hole 11 of the first coupling member 10, the hole 23 of the second coupling member 20, the hole 31 of the limit member 30, the hole 41 of the pusher 40, the hole 51 of the cam 50, and the hole 61 of the elastic member 60, with the holes 11, 23, 31, 41, 51, 61 being aligned one another. Then, by operably rotating the pushing section 43 of the pusher 40 to urge the limiting section 33 of the limit member 30 to move in the groove 13 and thereafter close the entrance "B" to an extent that the cable 2 is retained in the compartment "A" and is prevented from exiting from the entrance "B".

Figure 9:
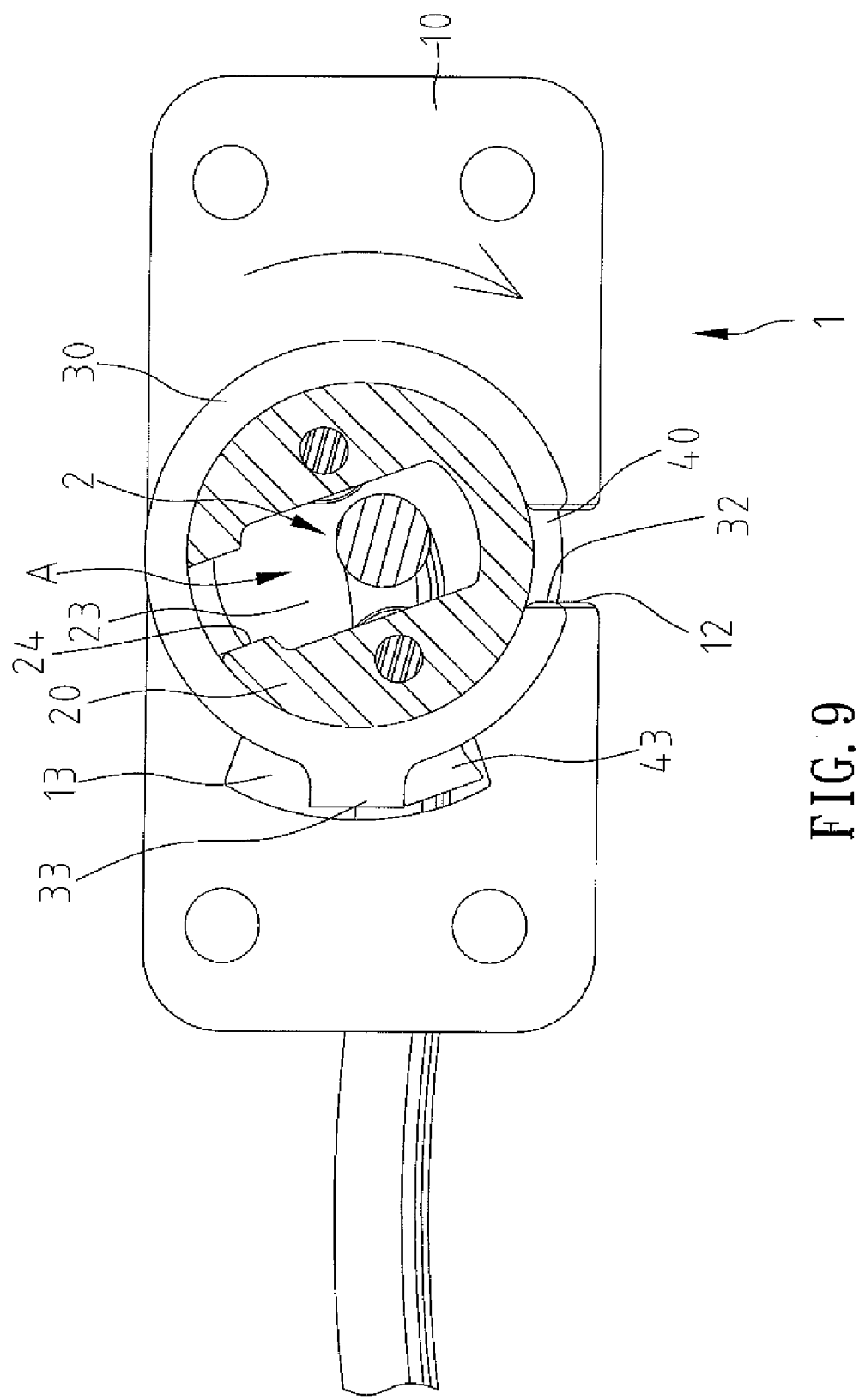
FIG. 9 is an extended view of FIG. 7 and shows the operation of the hinge assembly to close the entrance, with the hinge assembly operated in a clockwise direction.
Figure 10:
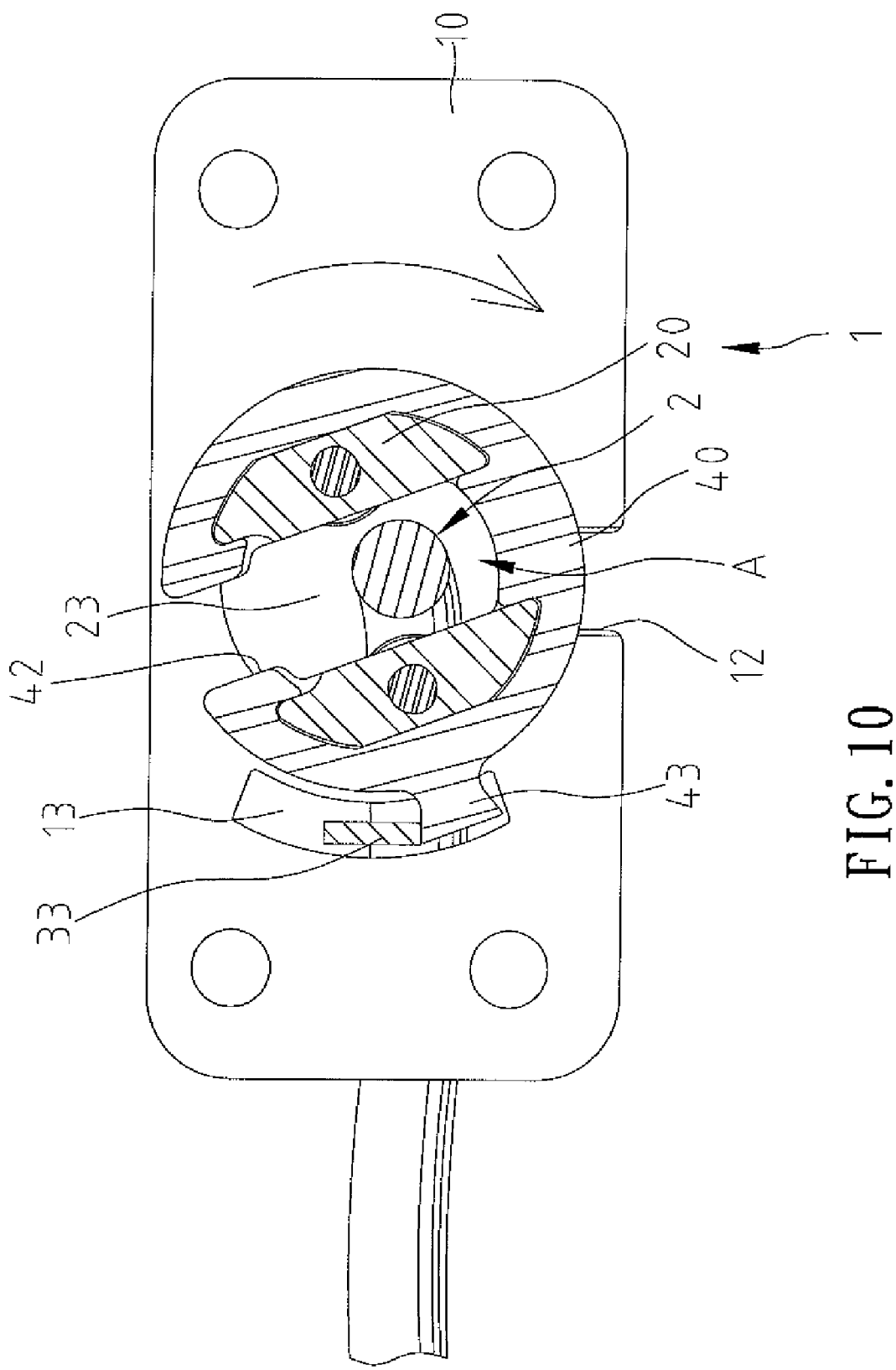
FIG. 10 is an extended view of FIG. 8 and shows the hinge assembly in a position corresponding to FIG. 9.
Figure 11:
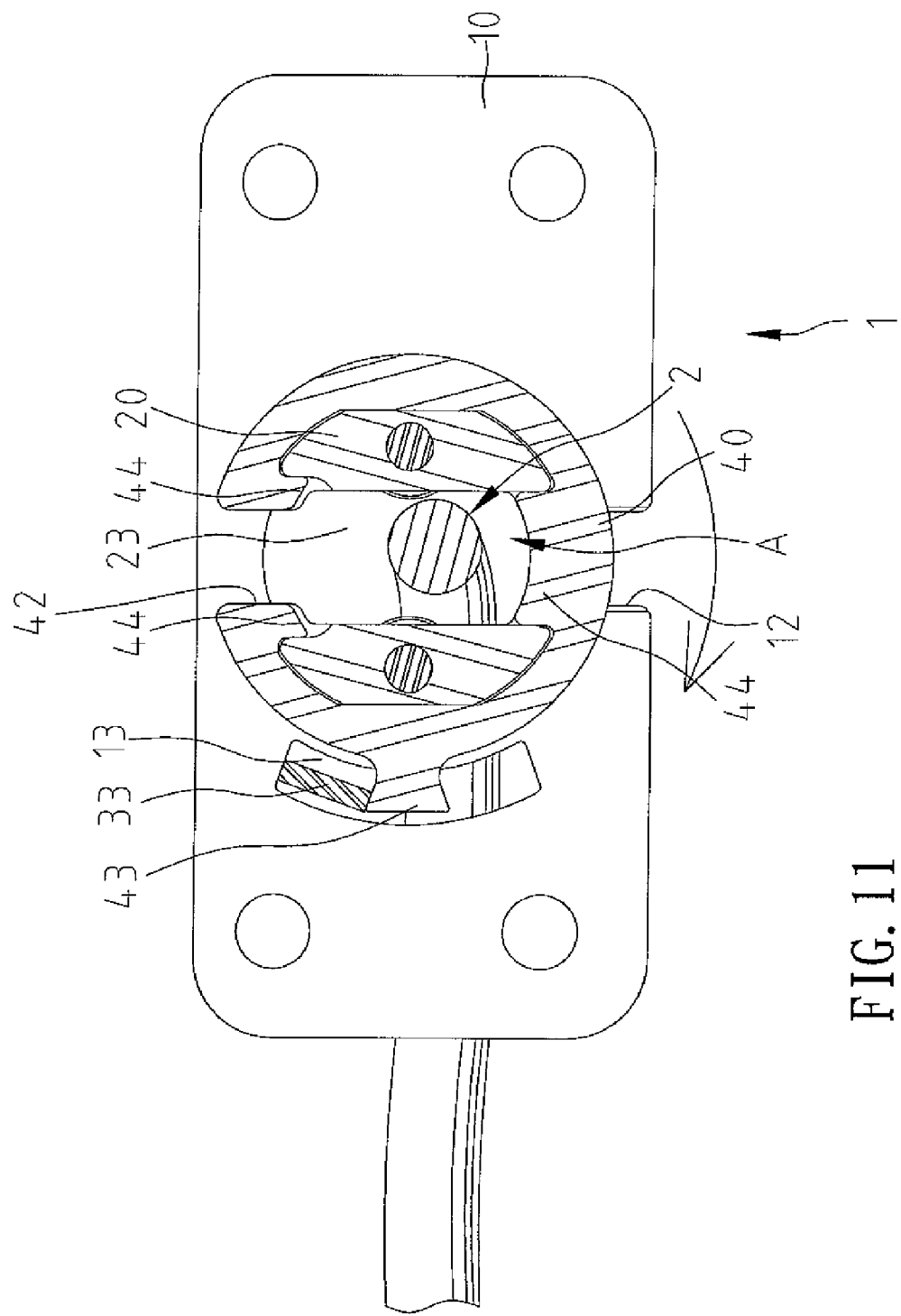
FIG. 11 is a cross-sectional view taken along line 11-11 of FIG. 3.
Figure 12:
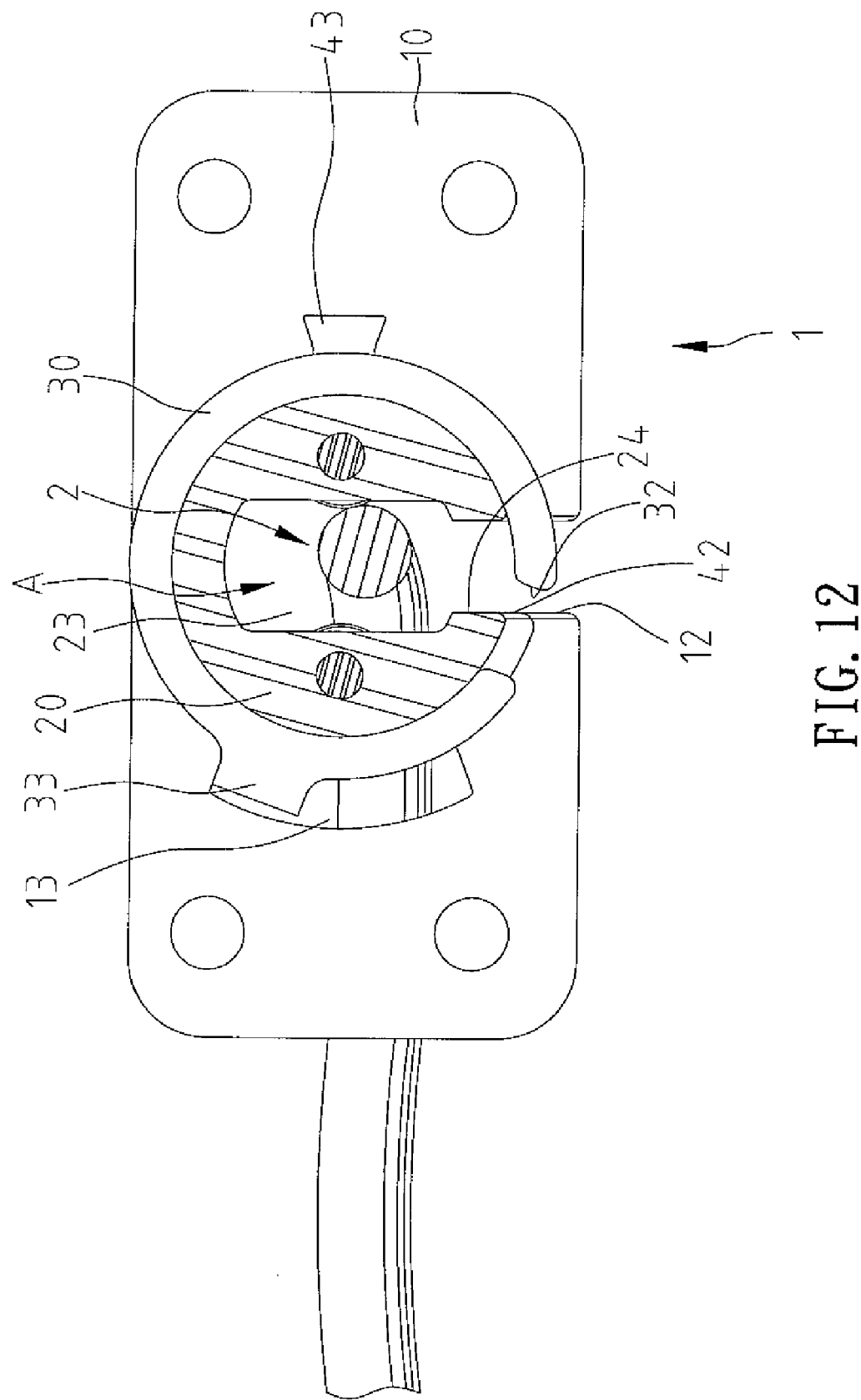
FIG. 12 is a cross-sectional view taken along line 12-12 of FIG. 3.
Figure 13:
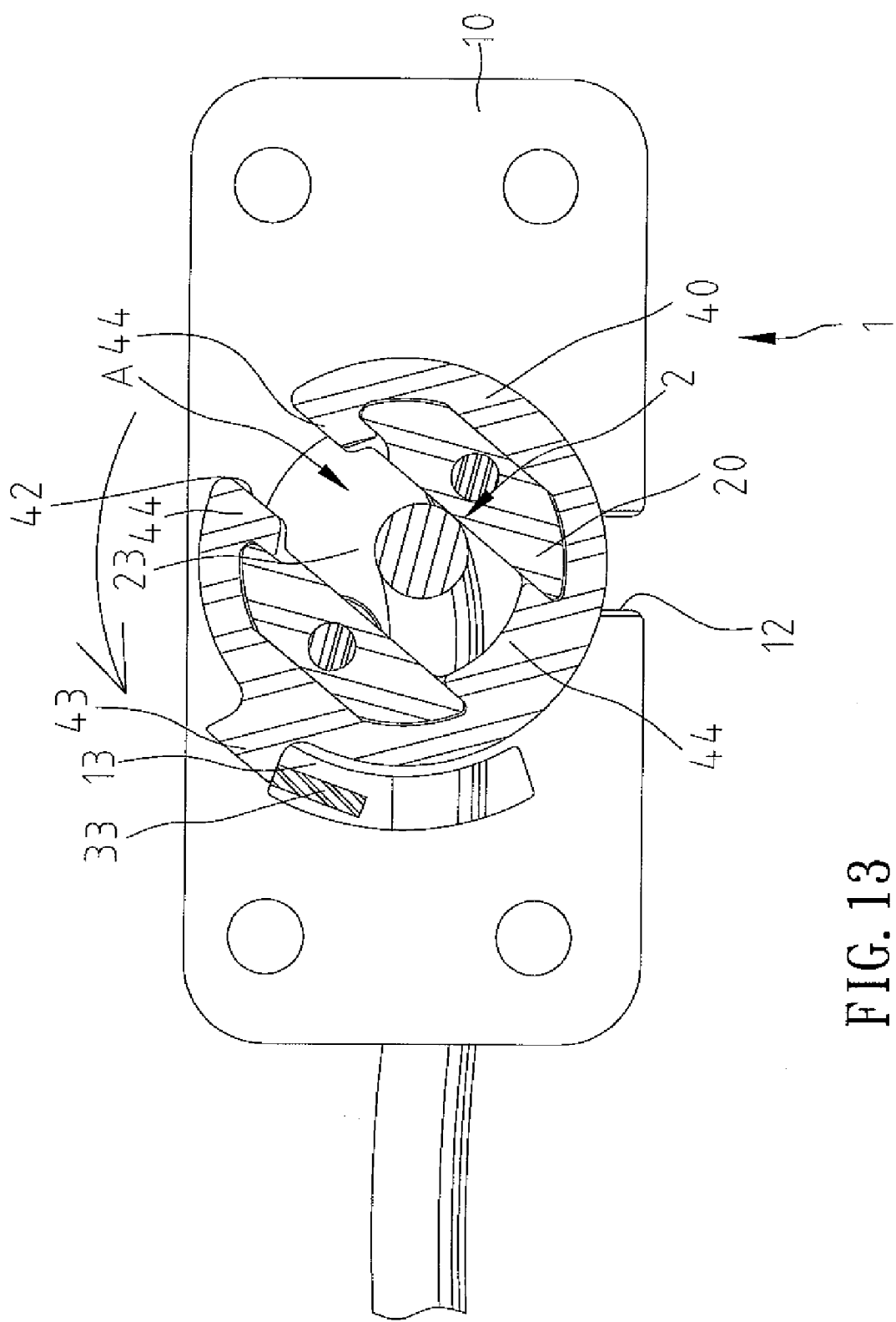
FIG. 13 is an extended view of FIG. 11 and shows the hinge assembly rotated in a counterclockwise direction.
Figure 14:
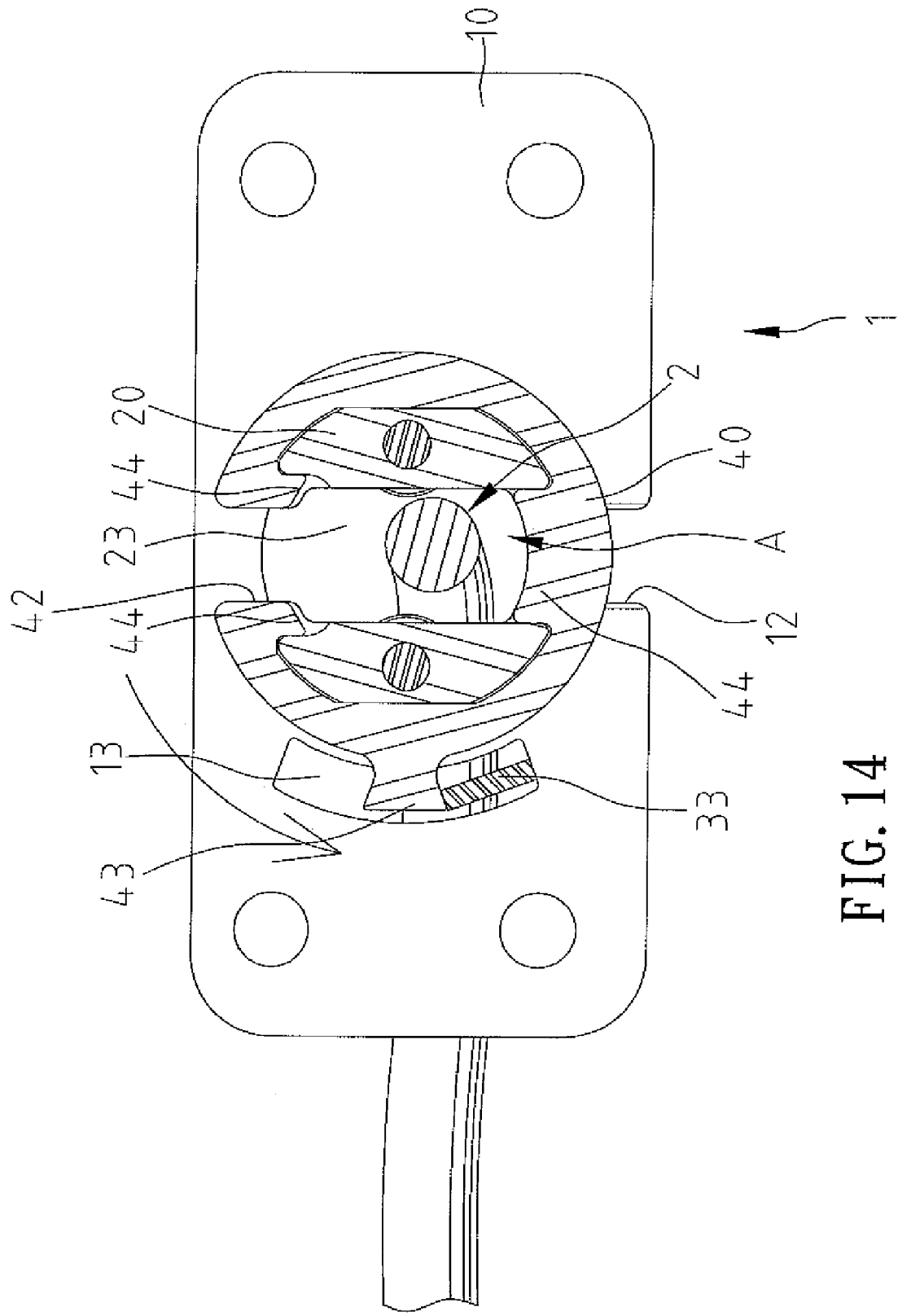
FIG. 14 is an extended view of FIG. 13 and shows the hinge assembly in a position closing its entrance.
Figure 15:
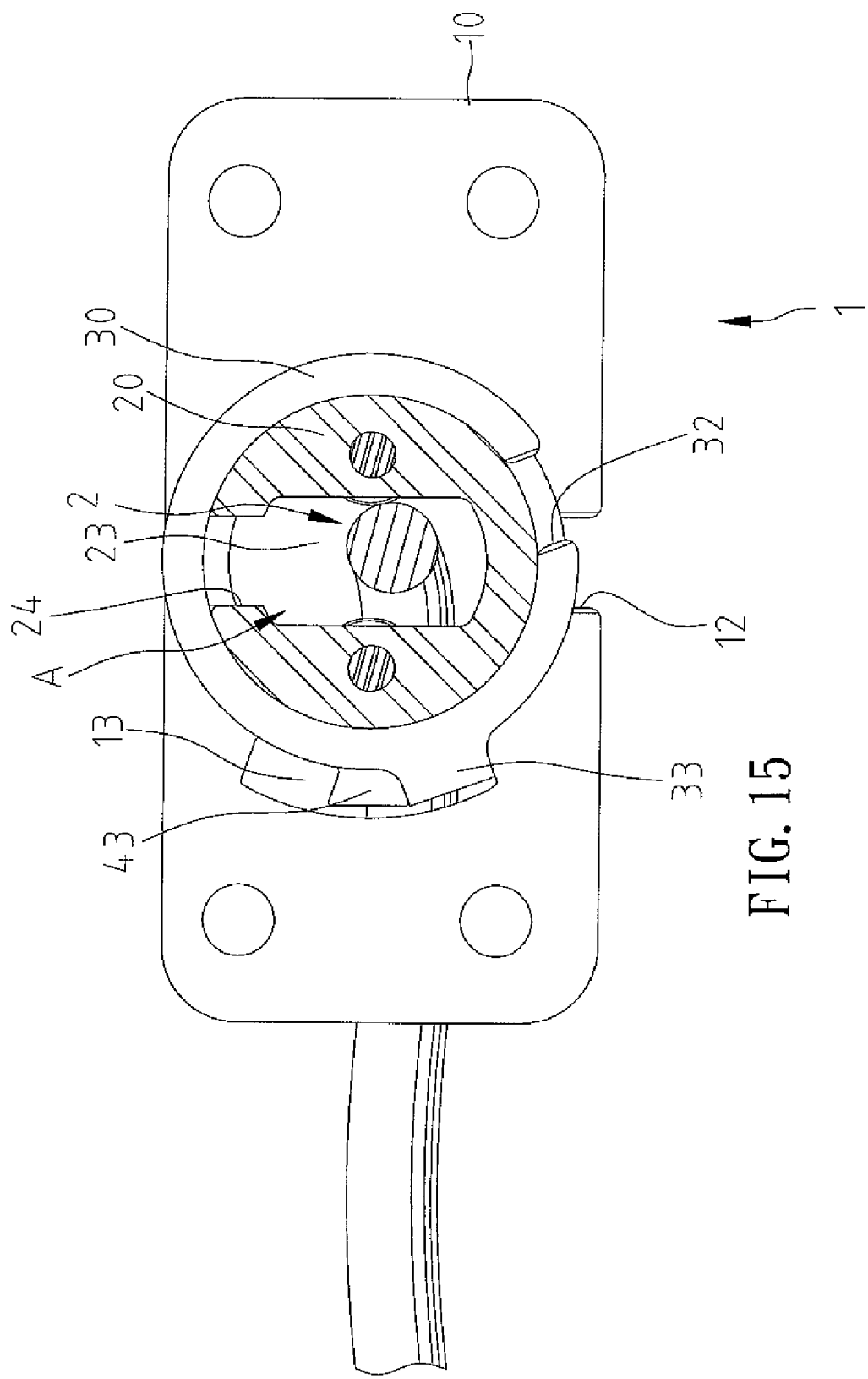
FIG. 15 is a cross-sectional view and shows the hinge assembly in a position corresponding to FIG. 14.
Figure 16:
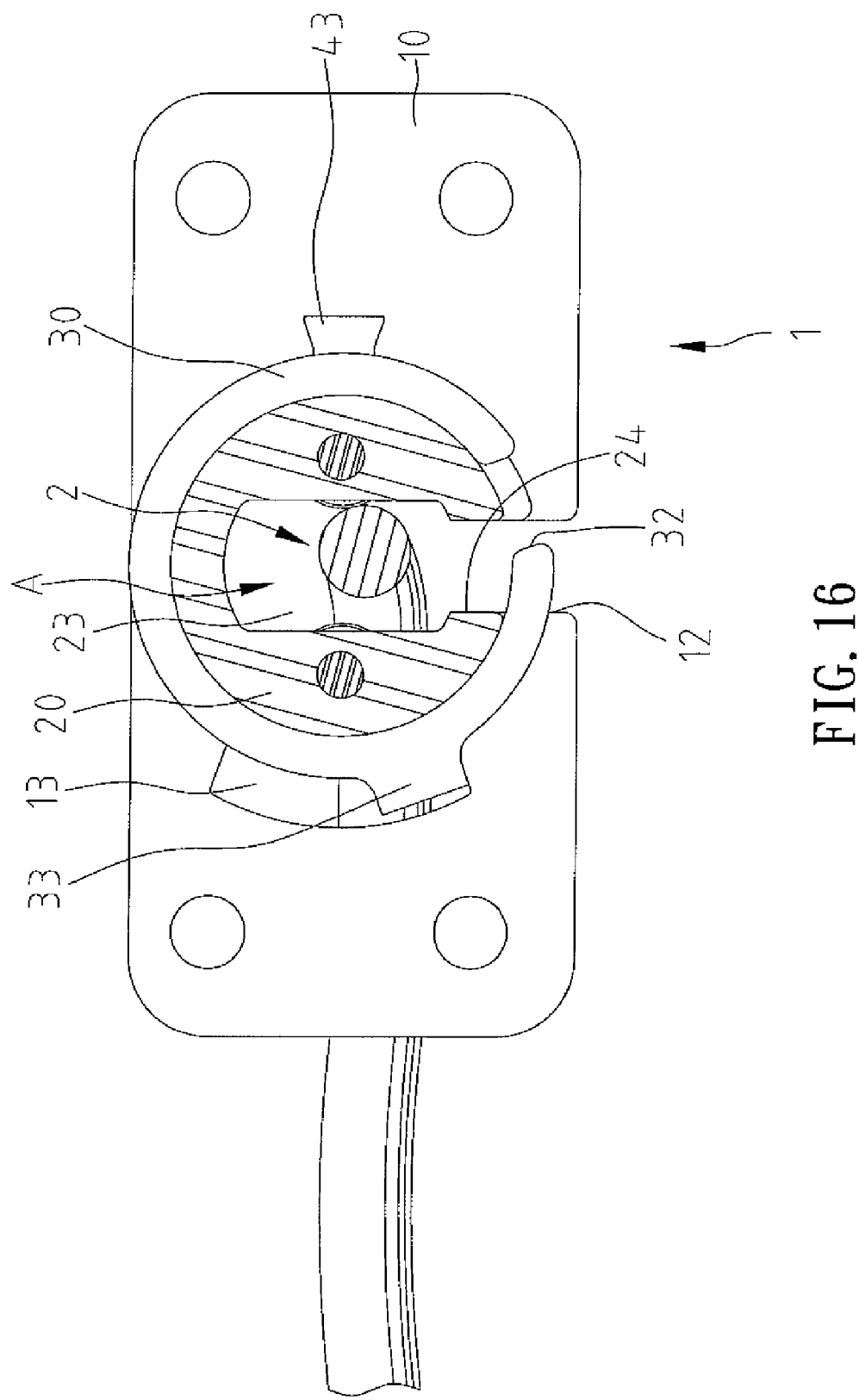
FIG. 16 is an extended view of FIG. 15 and shows the hinge assembly in a position preventing the cable from exiting from the entrance, with its pusher returned to a home position as shown in FIG. 7.

FIGS. 13 through 16 show that the pushing section 43 of the pusher 40 is adapted to be rotated in a direction opposite to a direction shown in FIG. 9. The limiting section 33 of the limit member 30 is adapted to be urged by the pushing section 43 to enable the limit member 30 to close the entrance "B" to an extent that the cable 2 is retained in the compartment "A" and is prevented from exiting from the entrance "B".

While the specific embodiments have been illustrated and described, numerous modifications come to mind without significantly departing from the spirit of invention, and the scope of invention is only limited by the scope of accompanying claims.

What is claimed is:

1. A hinge assembly adapted to allow a cable to be disposed therein quickly, comprising:
a first coupling member including a first hole and a first slot extending therethrough, with the first hole and the first slot connected to and in communication with each other, wherein the first coupling member includes a groove extending therein, wherein the first coupling member includes a plurality of cavities recessed from the second side towards the first side, wherein the plurality of cavities includes two first cavities and one second cavity, with the two first cavities disposed adjacent to the first hole with equal radial distance and one of the two first cavities connected to and in communication with the groove while another of the two first cavities including an enclosed circumferential edge, with the second cavity connected to and in communication with the first hole;
a second coupling member including a first engaging section inserted through and rotatable in the first hole, and a second hole and a second slot extending through the first engaging section, with the second hole and the second slot connected to and in communication with each other; and
a limit member engaged with and rotatable with respect to the first engaging section and including a third hole and a third slot extending therethrough, with the third hole being inserted by the first engaging section, with the third hole and the third slot connected to and in communication with each other, wherein the limit member includes a limiting
section extending therefrom and engaged in the groove, with the limiting section moveable in the groove upon rotation of the limit member;
wherein the first, second and third holes collectively define a compartment, with the first, second and third holes aligned one another, wherein the first, second and third slots collectively define an entrance, with the first, second and third slots aligned one another;
wherein the entrance defines a space with a predetermined size to allow insertion of the cable from the entrance into the compartment; and
wherein the limit member is operably rotatable to a first position where the third slot corresponds to and aligns with the first and second slot, and a second position where the third slot is out of alignment from the first and second slots and the entrance is closed by the limit member to an extent that the cable is retained in the compartment and is prevented from exiting from the entrance.

2. The hinge assembly as claimed in claim 1 wherein the first slot extends inwardly from a lateral edge of the first coupling member, which extends from circumferential edges of the first and second sides, to a circumferential edge of the first hole, and wherein the space defines a first space in the first slot, with the first space remaining constant or increased in size towards the lateral edge.

3. The hinge assembly as claimed in claim 1 wherein the second slot extends inwardly from an outer peripheral edge of the first engaging section to a circumferential edge of the second hole, and the space defines a second space in the second slot, with the second space remaining constant or increased in size towards the outer peripheral edge of the second hole.

4. The hinge assembly as claimed in claim 1 wherein the third slot extends inwardly from an outer peripheral edge of the limit member to a circumferential edge of the third hole, and wherein the space defines a third space in the third slot, with the third space remaining constant or increased in size towards the outer peripheral edge of the third hole.

5. The hinge assembly as claimed in claim 1 wherein the first slot extends inwardly from a lateral edge of the first coupling member, which extends from circumferential edges of the first and second sides, to a circumferential edge of the first hole, wherein the space defines a first space in the first slot, with the first space remaining constant or increased in size towards the lateral edge, wherein the second slot extends inwardly from an outer peripheral edge of the first engaging section to a circumferential edge of the second hole, and the space defines a second space in the second slot, with the second space remaining constant or increased in size towards the outer peripheral edge of the first engaging section, wherein the third slot extends inwardly from an outer peripheral edge of the limit member to a circumferential edge of the third hole, and wherein the space defines a third space in the third slot, with the third space remaining constant or increased in size towards the outer peripheral edge of the limit member.

6. The hinge assembly as claimed in claim 1 wherein the groove includes a circumferential edge which is enclosed.

7. The hinge assembly as claimed in claim 1 further comprising a pusher rotatable with the second coupling member and including a fourth hole and a fourth slot extending therethrough and connected to and in communication with each other, wherein the compartment is also defined by the fourth hole, with the first, second, third and fourth holes being aligned one another, and wherein the entrance is also defined by the fourth slot, with the first, second, third and fourth slots aligned one another.

8. The hinge assembly as claimed in claim 7 wherein the fourth slot extends inwardly from an outer peripheral edge of the pusher to a circumferential edge of the fourth hole, and wherein the space defines a fourth space in the fourth slot, with the fourth space remaining constant or increased in size towards the outer peripheral edge of the pusher.

9. The hinge assembly as claimed in claim 8 wherein the first slot extends inwardly from a lateral edge of the first coupling member, which extends from circumferential edges of the first and second sides, to a circumferential edge of the first hole, wherein the space defines a first space in the first slot, with the first space remaining constant or increased in size towards the lateral edge, wherein the second slot extends inwardly from an outer peripheral edge of the first engaging section to a circumferential edge of the hole, and the space defines a second space in the second slot, with the second space remaining constant or increased in size towards the outer peripheral edge of the first engaging section, and wherein the third slot extends inwardly from an outer peripheral edge of the limit member to a circumferential edge of the third hole, and wherein the space defines a third space in the third slot, with the third space remaining constant or increased in size towards the outer peripheral edge of the limit member.

10. A hinge assembly as adapted to allow a cable to be disposed therein quickly, comprising:
a first coupling member including a first hole and a first slot extending therethrough, with the first hole and the first slot connected to and in communication with each other, wherein the first coupling member includes a groove extending therein, wherein the first coupling member includes a plurality of cavities recessed from the second side towards the first side;
a second coupling member including a first engaging section inserted through and rotatable in the first hole, and a second hole and a second slot extending through the first engaging section, with the second hole and the second slot connected to and in communication with each other;
a limit member engaged with and rotatable with respect to the first engaging section and including a third hole and a third slot extending therethrough, with the third hole being inserted by the first engaging section, with the third hole and the third slot connected to and in communication with each other, wherein the limit member includes a limiting section extending therefrom and engaged in the groove, with the limiting section moveable in the groove upon rotation of the limit member;
a cam; and
an elastic member rotatable with the second coupling member, wherein the cam includes a plurality of protuberances selectively engagable in the plurality of cavities, wherein the elastic member is selectively depressed by the cam;
wherein the first, second and third holes collectively define a compartment, with the first, second and third holes aligned one another, wherein the first, second and third slots collectively define an entrance, with the first, second and third slots aligned one another;
wherein the entrance defines a space with a predetermined size to allow insertion of the cable from the entrance into the compartment; and
wherein the limit member is operably rotatable to a first position where the third slot corresponds to and aligns with the first and second slots, and a second position where the third slot is out of alignment from the first and second slots and the entrance is closed by the limit member to an extent that the cable is retained in the compartment and is prevented from exiting from the entrance.

11. The hinge assembly as claimed in claim 10 further comprising a pusher rotatable with the second coupling member and including a fourth hole and a fourth slot extending therethrough and connected to and in communication with each other, wherein the compartment is also defined by the fourth hole, with the first, second, third and fourth holes aligned one another, and wherein the entrance is also defined by the fourth slot, with the first, second, third and fourth slots aligned one another.

12. The hinge assembly as claimed in claim 11 wherein the fourth hole is inserted by the first engaging section of the second coupling member and includes a circumferential edge having a plurality of retaining members extending therefrom and hooked to a plurality of retaining sections defined on the first engaging section of the second coupling member in order to enable the pusher and the second coupling member to rotate together, and wherein the pusher also includes a pushing section extending radially outward therefrom and selectively engagable with the limiting section to urge the limiting section in the groove upon rotation of the pusher.

13. The hinge assembly as claimed in claim 10 wherein the cam includes a further hole and a further slot extending therethrough and connected to and in communication with each other, wherein the elastic member includes another hole and another slot extending therethrough and connected to and in communication with each other, wherein the compartment is also defined by the further and other holes, with the first, second, third, further and other holes being aligned one another, and wherein the entrance is also defined by the further and other slots, with the first, second, third, further and other slots being aligned one another.

14. The hinge assembly as claimed in claim 13 wherein the further hole is inserted by the first engaging section of the second coupling member, wherein the cam and the elastic element are mounted to the second coupling member by a fastener, with the fastener inserting through a first aperture of the elastic member, which extends therethrough, and the further hole, the first hole, the third hole, and engaged in an orifice extended in the first engaging section.

15. The hinge assembly as claimed in claim 13 wherein the further slot extends inwardly from an outer peripheral edge of the cam to a circumferential edge of the further hole, wherein the space defines a further space in the further slot, with the further space remaining constant or increased in size towards the outer peripheral edge of the cam, wherein the other slot extends inwardly from an outer peripheral edge of the elastic member to a circumferential edge of the other hole, and wherein the space defines another space in the other slot, with the other space remaining constant or increased in size towards the outer peripheral edge of the elastic member.

16. The hinge assembly as claimed in claim 10 wherein the second coupling member includes a second engaging section extending in a longitudinal direction transverse to a longitudinal direction of the first engaging section.

\* \* \* \* \*